United States Patent [19]

Withgott et al.

[11] Patent Number: 5,384,703
[45] Date of Patent: Jan. 24, 1995

[54] METHOD AND APPARATUS FOR SUMMARIZING DOCUMENTS ACCORDING TO THEME

[75] Inventors: M. Margaret Withgott, Los Altos Hills; Douglass R. Cutting, Menlo Park, both of Calif.

[73] Assignee: Xerox Corporation, Stamford, Conn.

[21] Appl. No.: 85,385

[22] Filed: Jul. 2, 1993

[51] Int. Cl.⁶ ............................... G06F 7/38; G06F 7/6
[52] U.S. Cl. .................... 364/419.19; 364/419.1; 364/419.13; 364/419.02; 364/419.08
[58] Field of Search ........... 364/419.1, 419.13, 419.19, 364/419.02, 419.08

[56] References Cited

U.S. PATENT DOCUMENTS

| | | | |
|---|---|---|---|
| 4,553,860 | 11/1985 | Imaizumi et al. | 400/68 |
| 4,965,763 | 10/1990 | Zamora | 364/419.19 |
| 5,077,668 | 12/1991 | Doi | 364/419.13 |
| 5,257,186 | 10/1993 | Ukita et al. | 364/419.1 |

OTHER PUBLICATIONS

Luhn, H. P. 1958 The Automatic creation of literature abstracts IBM Foundation of Research & Development pp. 159–165.
Jones, Richard L., 1990, Aida The Artificially Intelligent Document Analyzer. Computer Power Group, Canberra, Australia.
Salton, G. and M. F. McGill, 1983. Introduction to Modern Information Retrieval, New York: McGraw-Hill.
Luhn, H. P. 1958, The Automatic Creation of Literature Abstracts. IBM Foundation of Research and Development, 2(4): 314–319.
Paice et al., "The Identification of Important Concepts in Highly Structured Technical Papers"; ACM-SIGIR'93–Jun. 1993/ Pittsburgh, Pa. USA; pp. 69–78.

Primary Examiner—Gail O. Hayes
Assistant Examiner—Gita D. Shingala
Attorney, Agent, or Firm—Oliff & Berridge

[57] ABSTRACT

A summary is automatically formed by selecting regions of a document. Each selected region includes at least two members of a seed list. The seed list is formed from a predetermined number of the most frequently occurring complex expressions in the document that are not on a stop list. If the summary is too long, the region-selection process is performed on the summary to produce a shorter summary. This region-selection process is repeated until a summary is produced having a desired length. Each time the region selection process is repeated, the seed list members are added to the stop list and the complexity level used to identify frequently occurring expressions is reduced.

55 Claims, 12 Drawing Sheets

| Particle | Meaning |
|---|---|
| は (wa) | SENTENCE TOPIC |
| が | SUBJECT ("DOER" OR "UNDERGOER" OF THE ACTION, STATE, ETC.) |
| を (o) | DIRECT OBJECT (THING ACTED UPON) |
| に | (1) INDIRECT OBJECT ("RECEIVER" OF THE ACTION)<br>(2) LOCATION OR TARGET TOWARD WHICH THE ACTION OR MOTION PROGRESSES (TO)<br>(3) LOCATION IN/AT WHICH SOMETHING EXISTS, RESIDES, ETC.<br>(4) TIME (AT)<br>(5) PURPOSE (TO) |
| で | (1) IMPLEMENT OR MEANS (BY, WITH)<br>(2) LOCATION IN/AT WHICH THE ACTION OCCURS OR IS DONE<br>(3) CAUSE, REASON OR PURPOSE |
| へ (e) | DIRECTION (TO, TOWARD) |
| から | FROM (BEGINNING POINT IN TIME OR PLACE, ORIGIN) |
| まで | UNTIL (UP TO AND INCLUDING) |
| の | "POSSESSIVE" MARKER |
| と | (1) _AND_   (2) TOGETHER WITH  (3) QUOTATION MARKER |
| か | (1) QUESTION MARKER (2) _OR_ |
| とか | FOR EXAMPLE, _, _, ETC. |
| も | ALSO, TOO, AS WELL AS, EVEN |
| が | (1) BUT    (2) SOFTENING |
| けれども | BUT |
| でも | HOWEVER, BUT |
| しかし | HOWEVER, BUT |
| ところが | BUT IN FACT |
| から | BECAUSE |
| ので | BECAUSE |
| のに | EVEN THOUGH, IN SPITE OF THE FACT THAT |
| とき | WHEN |
| ところで | BY THE WAY, TO CHANGE THE SUBJECT... |
| そして | THEN |
| そうしたら | AND THEN |
| そうなら | IF SO, IF THAT'S THE CASE |
| それから | AND THEN, NEXT... |
| それに | BESIDES, MOREOVER |
| それで | AND THEN, CONSEQUENTLY, FOR THAT REASON |
| それとも | OR ELSE |
| それでも | EVEN SO, IN SPITE OF THAT |
| ね | TAG QUESTION MARKER |

| | |
|---|---|
| 一 | ONE |
| 什么 | WHAT |
| 是 | IS |
| 的 | NOUN ATTRIBUTIVE |
| 对 | TOWARDS, TREAT |
| 有 | HAS, HAVE |
| 在 | IN, INDICATION OF POSITION OF THINGS |
| 就是 | IS PRECISELY, EXACTLY JUST |
| 为了 | IS FOR |
| 可以 | CAN, COULD |
| 做 | TO MAKE, DO |
| 个 | MEASURE WORD FOR OBJ. |
| 中 | IN THE CENTER, MIDDLE |
| 它 | IT (NEUTRAL) |
| 能 | CAN, ABLE TO |
| 这 | THIS |
| 不 | NEGATION (NO, NOT) |

FIG.8

| | | | |
|---|---|---|---|
| 只 | ONLY | 如果 | IF |
| 我們 | WE, US | 話 | WORD, REMARK GOES WITH 如果 |
| 作 | MAKE, DO | 也 | ALSO, AS WELL |
| 不同 | NOT THE SAME (DIFFERENT) | 每 | EVERY |
| 些 | SOME, THESE | 對於 | WITH RESPECT TO |
| 之 | IT, PRONOUN USED ONLY AS OBJ. | 當 | WHEN, AT THE TIME |
| 而 | SIMILAR TO "AND" | 時候 | TIME, THAT MOMENT |
| 其他 | OTHER, ELSE | 就 | THEN |
| 後 | LATER, AFTERWARDS | 會 | CAN, BE ABLE TO |
| 下 | UNDER, DOWN | 可 | CAN BE |
| 顯得 | SEEM, APPEAR TO BE | 為 | AS, TO BE, MEAN FOR |
| 更 | EVEN MORE | 常 | FREQUENT |
| 必要 | NECESSARY, REQUISITE | 被 | WAS (PASSIVE) |
| 因此 | THEREFORE | | |
| 了 | (USED AFTER VERB OR ADJ. TO INDICATE COMPLETION OF WORK OR CHANGE) | | |
| 主要 | THE MAIN | | |
| 因为 | BECAUSE | | |

FIG. 9

| 所 | THAT WHICH |
| 各 | EACH, EVERY |
| 二 | TWO |
| 叫 | CALLED |
| 放 | PUT, PLACED |
| 各位 | EVERYBODY |
| 看到 | SEE THAT, LOOK |
| 和 | AND |
| 为什么 | WHY |
| 但是 | BUT, YET |
| 它们 | THEY (NEUTRAL) |
| 却 | BUT, YET, HOWEVER |
| 都 | ALL |
| 只有 | ONLY, WHEN |
| 内 | INSIDE |
| 才 | THEN, USED BEFORE VERB TO INDICATE SOMETHING JUST HAPPENED |
| 三 | THREE |
| 如何 | HOW (TO) |

| 请 | PLEASE |
| 选择 | CHOOSE |
| 新 | NEW |
| 时 | AT THIS TIME |
| 出现 | APPEAR |
| 您 | YOU (POLITE) |
| 其中 | AMOUNG |
| 分 | IS DIVIDED INTO |
| 两 | TWO |
| 来 | INORDER TO, COME |
| 现在 | NOW, PRESENTLY |
| 下面 | BELOW |
| 要 | WANT, NEED |
| 又 | AGAIN, INDICATES REPITITION, CONTINUATION |

FIG.10

| | | | |
|---|---|---|---|
| 法 | METHOD | 以從 | AFTERWORDS |
| 送 | SEND | 裡 | IN(SIDE) |
| 字 | CHARACTER | 已經 | ALREADY |
| 後面 | BEHIND | 知道 | KNOW |
| 以 | IN ORDER TO | 比較 | COMPARATIVELY (MORE) |
| 行 | A LINE, TO WALK | 像 | BE LIKE |
| 將 | ABOUT TO, WILL | 樣 | THIS KIND, TYPE |
| 成 | CHANGE, TURN INTO | 呢 | USED AT END OF INTERROGATIVE SENTENCE |
| 則 | (IF)... THEN, INDICATES CAUSE AND EFFECT | 或 | OR |
| | | 說 | SPEAK |
| 看 | LOOK AT, SEE | 先 | FIRST |
| 項 | MEASURE WORD (ITEMS) | 跟 | WITH, AND |
| 此 | THIS, THESE | 等到 | BY THE TIME, WAIT UNTIL |
| 到 | REACH TO, COME TO | | |
| 所有 | ALL | 照 | ACCORDING TO |
| 用 | USE | 以前 | BEFORE, IN THE PAST |
| 四 | FOUR | | |
| 開 | OPEN, START | 但 | BUT |

FIG.11

| Chinese | English |
|---|---|
| 不然 | OTHERWISE |
| 没有 | NONE, NOT |
| 整個 | ENTIRE, WHOLE |
| 因而 | THUS, AS A RESULT OF |
| 名 | THE NAME |
| 再 | AGAIN |
| 還是 | STILL, NEVERTHELESS |
| 是否 | WHETHER OR NOT |
| 不行 | DON'T DO |
| 任何 | ANY |
| 他們 | THEY, US |
| 能否 | CAN ONE |
| 仍 | STILL |
| 當然 | OF COURSE |
| 份 | COPIES (MEASURE WORD) |
| 否則 | OTHERWISE, LEST |

FIG.12

METHOD AND APPARATUS FOR SUMMARIZING DOCUMENTS ACCORDING TO THEME

BACKGROUND OF THE INVENTION

1. Field of the Invention

The invention relates to methods and apparatus for automatically producing summaries of documents and, in particular, utilizing simple natural language processing and relying on statistical properties of text to produce such summaries.

2. Description of Related Art

Document summaries assist in the review of documents because entire documents do not need to be read. Additionally, document summaries can reduce translation costs when reviewing one or more documents in a foreign language because only the document summary—not the entire document—needs to be translated. After reviewing the translated document summary, the reviewer can determine whether the entire document should be translated.

When documents are not provided with a summary, it is necessary to produce a summary of the document to obtain the benefits discussed above. It is desirable to produce document summaries automatically so that people do not have to read an entire document to produce a summary. Such automatic summaries should accurately reflect the main theme(s) in the document to assist people in deciding correctly whether to read (and-/or have translated) the entire document.

Two basic computational techniques exist for automatic document summarization. The first intensively uses natural language processing and semantic network creation. The second uses simple natural language processing and then relies on statistical properties of the text.

The first technique is computationally expensive. Additionally, creating semantically correct summaries is difficult and error prone. Typically, a domain must be known in advance in order to perform adequate semantic modeling. Such techniques may not be used on ordinary text, unrestricted in content.

"Automatic Text Processing"; Gerald Salton; Addison-Wesley; 1989 discloses a summarization technique of the second type. Text words from a corpus of documents are isolated. Words used in titles, figures, captions and footnotes are flagged as title words. The frequency of occurrence of the remaining text words within the document corpus is determined. Word weights are determined based on the location and frequency of occurrence of the words in individual documents and in the document corpus. Phrase weights are determined for coocurring words (phrases) in sentences of a document. The sentences in each document are then scored based on the weights of the words and phrases in each sentence. A number of topscoring sentences are then selected from a document to produce a summary having a predetermined length.

The technique described by Salton uses a corpus of documents to calibrate the weights of the words and phrases. Thus, the term weights are not customized to an individual document. This could result in the inclusion of sentences in a document's summary that do not assist in describing a theme of the document. Additionally, an overly-narrow cross section of the document may be extracted because the technique of Salton creates the document summary from a single pass through the document. The selection of only the highest scoring sentences may lead to a disjointed summary that does not convey a cogent theme.

SUMMARY OF THE INVENTION

Methods and apparatus, according to the invention, form a summary by selecting regions of a document. Each selected region includes at least two members of a seed list. The seed list is formed from a predetermined number of the most frequently occurring complex expressions in the document that are not on a stop list. If the summary is too long, the region-selection process is performed on the summary to produce a shorter summary. This region selection process is repeated until a summary is produced having a desired length. Each time the region selection process is repeated, the seed list members are added to the stop list and the complexity level used to identify frequently occurring expressions is reduced.

When the text is formed from sentences arranged in paragraphs, each selected region preferably corresponds to a sentence containing at least two members of the seed list, and the immediately preceding and following sentences contained in the same paragraph.

Regions located in the title, first paragraph and/or last paragraph of the document that are included in the first summary can be maintained in the final summary because they usually relate to the theme of the document. Word stemming can also improve results.

Commonly used function words such as conjunctions joining words or phrases, articles introducing noun phrases, and modals modulating the meaning of verbs initially can be included in the stop list to improve efficiency. Alternatively, the stop list can be empty for the first iteration of the region-selection process.

The invention is particularly useful with documents written in the form of prose, as opposed to degenerate text such as phone books, spread sheets, dictionaries, etc., which do not usually convey a theme.

The invention is applicable to text written in a variety of languages. In text using roman characters, such as English, the expressions correspond to words, and the seed list includes the most frequently occurring lengthy words. For languages that employ chinese characters (such as Mandarin), expressions correspond to characters and character strings. The seed list includes the most frequently occurring complex characters and character strings, where complexity is defined by the number of strokes in the character or character string. Complex expressions in Japanese language documents correspond to long hiragana/katakana/roman character strings and to chinese (kanji) characters and character strings having a predetermined minimum number of strokes. The word or character string length and the complex character or character string stroke number is reduced each time the region-selection process is performed.

The resulting summaries are comprised of well-formed sentences (assuming the original document contained such sentences) that convey the theme of the document. No natural language parsing or semantic networks are required. Thus, computational costs are low.

BRIEF DESCRIPTION OF THE DRAWINGS

The invention will be described in conjunction with the following drawings in which like reference numerals refer to like elements and wherein.

DETAILED DESCRIPTION OF PREFERRED EMBODIMENTS

The invention provides a summary of a document that conveys the theme(s) of the document. The invention automatically locates regions (e.g., sentences) in the document that convey the conceptually dominate theme(s) of the document, and then forms a summary from those regions. The invention operates on the theory that regions of the document containing frequently used complex expressions pertain to the theme of the document, and therefore are useful for forming a thematic document summary.

The invention is useful with most types of documents and, particularly, with documents written in the form of prose, as compared with degenerate documents such as telephone directories, spreadsheets and dictionaries, which usually do not convey a theme.

The invention is useful with documents written in numerous languages including English, Japanese and Chinese. In English-language documents, expressions correspond to words, and complexity is quantified by word length. In languages that employ chinese characters (such as Mandarin), expressions correspond to characters and character strings, and complexity is quantified by the number of strokes in a character or character string. In Japanese language-documents, expressions correspond to hiragana/katakana/roman character strings, kanji characters, and kanji character strings. In Japanese language documents, complexity is quantified by the length of hiragana/katakana/roman character strings and the number of strokes contained in kanji characters and kanji character strings.

Figure 1:
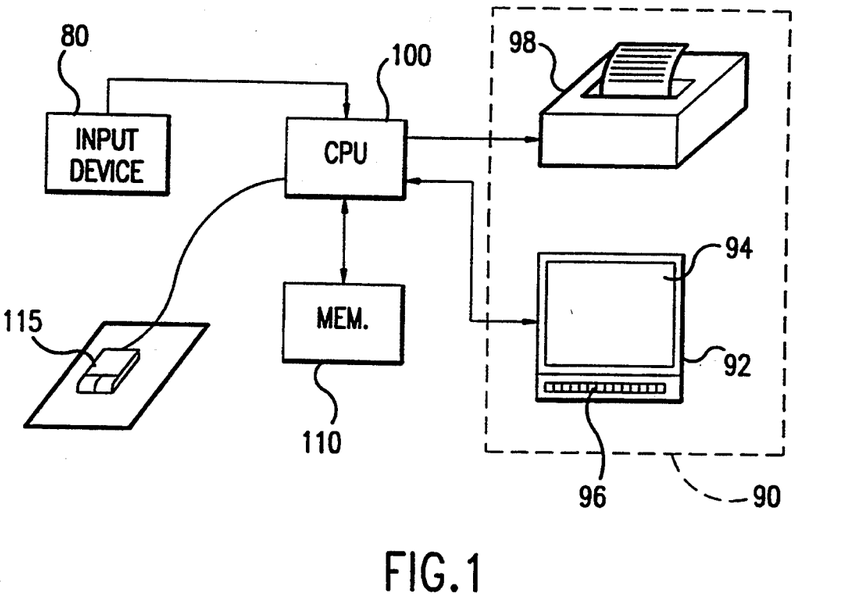
FIG. 1 is a block diagram of an apparatus according to the invention for carrying out document summarization.

With reference to FIG. 1, the theme summarization method of the invention is performed either on an electronic (bitmap) image of an original document or on a document stored as character codes (e.g., ASCII data). The method is performed by a special or general purpose digital computer 100 that uses procedures stored in a memory 110. The electronic document (bitmap image data or character code data) is input to computer 100 by input device 80. Input device 80 can be, for example, a word processing station, a disk drive, a modem, a scanner with or without an optical character recognizer (OCR), etc. The document summary can be output from computer 100 to output device 90. Output device 90 can include an output display 92, a printing device 98, or a memory or other form of storage device. Output display 92 can include a touchscreen 94 so that a user can interact with computer 100. Means other or in addition to touchscreen 94 can be provided for supplying commands or other information to computer 100. For example, a keyboard 96 and/or a mouse 115 can be used to interact with computer 100.

Figure 2:
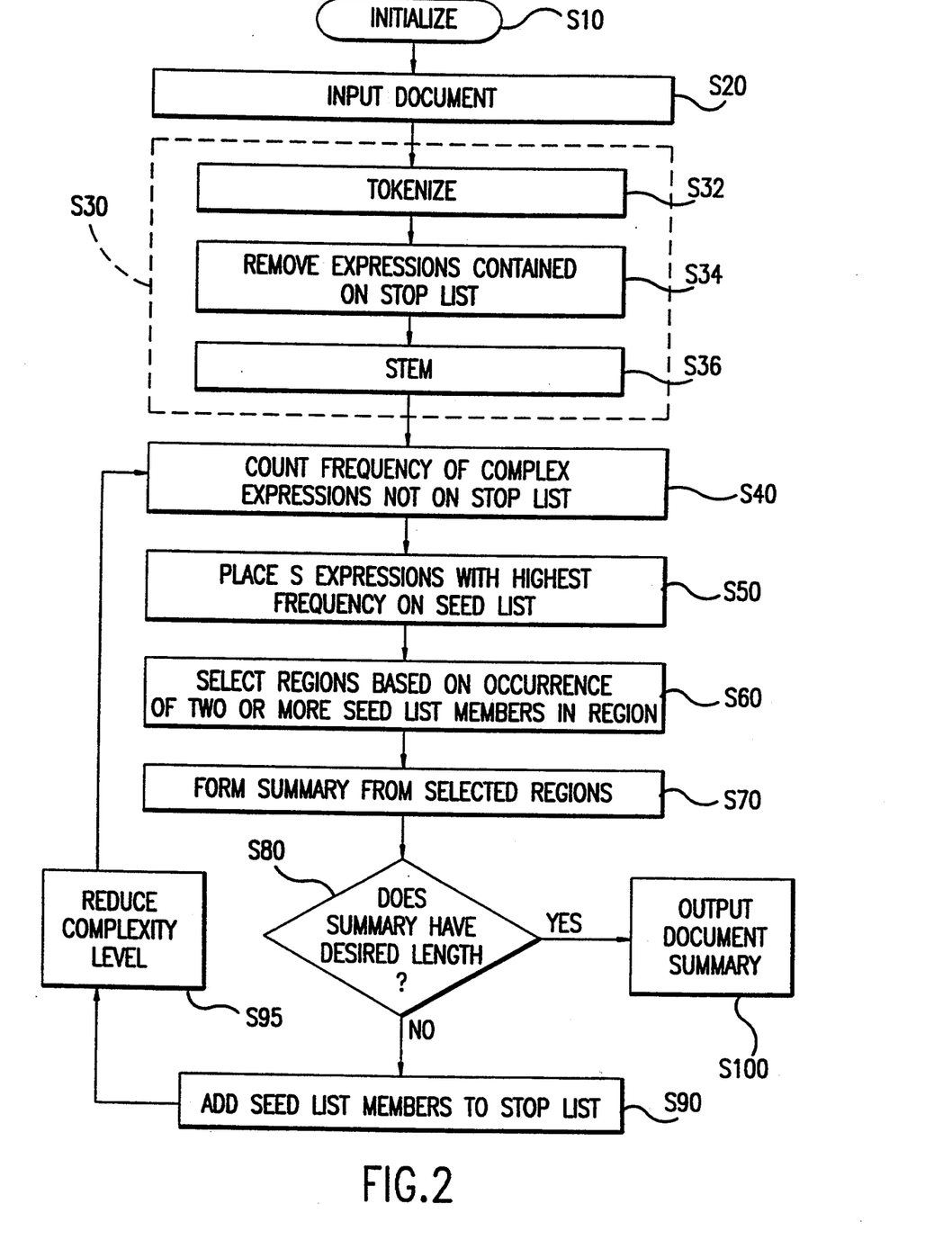
FIG. 2 is a flowchart of the general document summarization method of the invention.

FIG. 2 is a flowchart illustrating an embodiment of the theme summarization process.

A number of preliminary steps are performed. In an initialization step, S10, a complexity level and a seed list size are predetermined. Such parameters can be input by a user, or default values can be used. Additionally, initial members of a stop list which is stored in computer memory can be defined in S10. Next, in S20 a document or plurality of documents are input, and stored in computer memory. Although a plurality of documents can be input, the method preferably creates a document summary without using any information relating to the other documents (unlike Salton). Documents can be input as character codes, e.g., from a word processor, or as bitmap images, e.g., from a scanner without an OCR.

Next, a preprocessing step, S30, is performed. The preprocessing step at least includes tokenizing the document in S32. Tokenizing comprises breaking the document into a plurality of expressions. For example, in an English-language document, the tokenizing step corresponds to identifying all words in the document. If any expressions are initially placed on the stop list, these expressions are then removed from the document, or otherwise flagged relative to the remaining text in S34. Initial members of the stop list can be, for example, frequently used expressions that serve as syntactic glue such as, for example, conjunctions joining words or phrases, articles introducing noun phrases, and modals modulating the meaning of verbs, etc. Additionally, a stemming operation, S36, can be performed on the document expressions.

After preprocessing the document, the theme summarization process can begin. In step S40, the frequency of occurrence of complex expressions, not contained in the stop list, and located in the document is determined. In step S50, a seed list is formed from a predetermined number, S, of expressions having the highest frequency as determined in step S40. The seed list is stored in computer memory and then used to identify regions of the document that likely relate to the theme(s) of the document. In step S60, regions of the document are selected based on the occurrence of two or more seed list members in those regions. In a preferred embodiment, where the document is in the form of plural sentences forming plural paragraphs, each region corresponds to a sentence containing at least two members of the seed list and the immediately preceding and following sentences located in the same paragraph. Inclusion of the immediately preceding and following sentences provides context and makes the resulting summary read better. If the document does not include plural sentences (which may be the case in some documents written in languages other than English), the region selection criteria can be the location of two members of the seed list within a predetermined proximity of one another. The selected region preferably would correspond to the seed list members, the intervening text, and some predetermined amount of text preceding and following the seed list members. In step S70, a summary of the document is formed from the selected regions and stored in computer memory. This summary could be formed by extracting the selected regions from the document, or by other means.

The summary formed from this first iteration of steps S40–S70 typically results in the elimination of approximately 70% of the text from the original document. Depending on the length of the original document, one iteration of steps S40–S70 may produce a summary short enough to form the final document summary. Typically, the document summary is required to have a length of one page or less.

In S80, a determination is made as to whether the summary produced in S70 has the desired length. The desired length can be input by a user, or can be a predetermined default length. If the result of S80 is affirmative, flow proceeds to S100 where the summary is output as the document summary. The document summary can be output to display 92, printer 98, or to a memory. The output document summary could be output as a result of a text search process so that an operator does not have to read an entire document identified during a search. Instead, only the document summary need be reviewed. The document summary could be invoked automatically by operator selection of a summarize document button (as opposed to an output entire document button) during searching.

If the result of S80 is negative, flow proceeds to S90. In S90, the seed list members are added to the stop list. Next, in S95, the complexity level is reduced. Flow then returns to S40 for a second iteration of steps S40–S80. This second iteration is performed on the summary, previously produced in S70. However, a subset of the regions previously selected in S60 will be selected because the previous members of the seed list are now on the stop list and because the complexity level has been reduced.

Steps S40–S80 will continue to repeat until a summary is formed having the desired length. Each time steps S40–S80 are repeated, the size of the stop list increases (as former members of the seed list are added to the stop list) and the complexity level is reduced.

The output of the process can be modified by tagging regions located in the first and/or last paragraphs of the document that were selected the first time S60 was performed and maintaining these regions in the final output document summary. This additional step or steps can improve the output document summary because the first and last paragraphs of the document typically relate to the overall theme of the document.

Due to the iterative nature of the invention, cogent themes emerge in the resulting document summary. Because the number of lines in the document is pared down in successive steps based on whether those lines have in the past, or now have, words in them that are members of a seed list, the lines that remain do so because frequent stop words (such as "a", "the", "and", etc.) were permitted to form the seed list, or if there were successive homonyms in the original document (e.g., if the document had an unusual number of types of words such as "bank" (river banks or financial institutions)), and an unusually high number of tokens of those homonyms.

Examples of the invention as applied to English, Japanese, and Chinese language documents will now be described. The written embodiments of expressions in these languages differs and, therefore, the way in which text is classified as complex differs between these languages. In English-language documents, expressions are conveyed in the form of words. Thus, complex expressions correspond to lengthy words. The Chinese-language uses characters to represent expressions. A character can correspond to a single word or to, plural words (a phrase). Additionally, characters can be compounded in the Chinese language. Accordingly, expressions correspond to one or more characters. Complexity is determined by the number of strokes contained in the character or character string. The Japanese language uses Chinese characters and other characters (roman characters and syllabaries such as hiragana and katakana characters) to form expressions that may correspond to one or more words. Thus, the stroke complexity of kanji characters and character strings, and the character length complexity of hiragana, katakana and roman character strings are considered for Japanese language documents.

Figure 3:
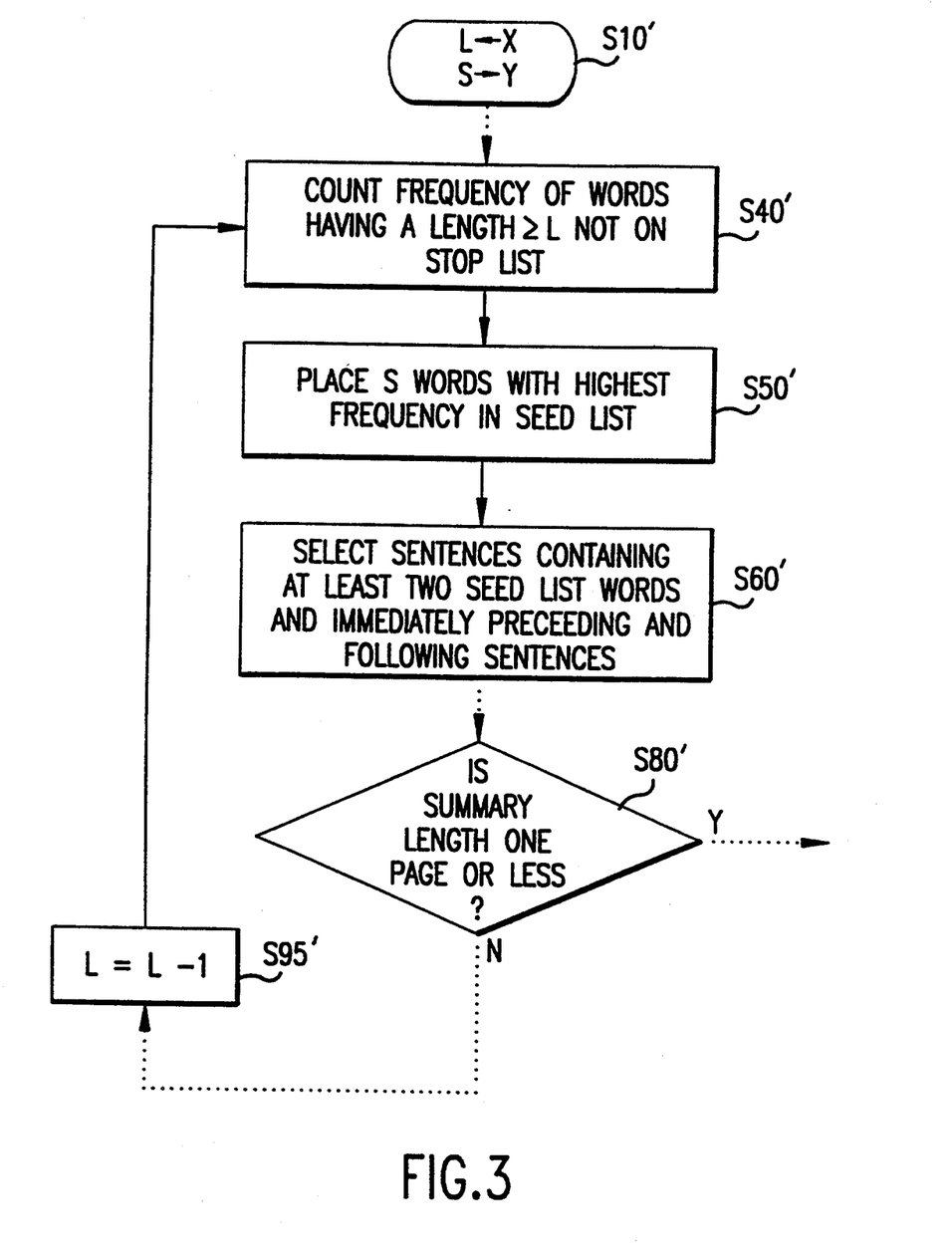
FIG. 3 is a partial flowchart of the FIG. 2 method adapted for English-language documents.

FIG. 3 is a partial flowchart of the FIG. 2 method illustrating the specific steps used for forming a summary of an English-language document. In such a document, the method is performed based on the frequency of occurrence of complex words in the document. Complex words are defined as words having a length (i.e., number of characters) equal to or greater than some predetermined length.

In the initialization step, S10', an initial value, X, is assigned to the predetermined word length variable, L. Additionally, a value, Y, is assigned to the parameter S that defines the number of members in the seed list. In a preferred embodiment, S=6, and, initially, L=8. These predetermined values can be input by the operator or can be default values. Referring to FIG. 2, a document is then input in S20, and the preprocessing step or steps are performed in S30. Preprocessing includes at least the tokenization step S32. Additionally, the stop list can be initialized to contain commonly used words, which are then removed from the document in S34. Alternatively, the stop list is initially empty. Stemming operations can also be performed in S36.

Referring to FIG. 3, in S40', the number of occurrences of words having a length of at least L and not contained on the stop list are determined. In S50', S words having the highest frequency, as determined in S40', are placed in the seed list. Next, in S60', sentences containing at least two members of the seed list and the immediately preceding and following sentences are selected. These selected sentences are then used to form a summary in S70. Usually, the sentences are maintained in their original reading order when placed in the summary. If multiple sentence triplets are from a single paragraph of the original document, they are placed in a single paragraph of the summary. If sentence triplets are from different paragraphs in the original document, they can be placed in different paragraphs of the summary.

In S80', a determination is made as to whether the summary has a length of one page or less. Of course, a length other than one page can be used as the predetermined summary length. If the result of S80' is affirmative, the summary is output as a document summary in S 100. If the result of S80' is negative, the six words on the seed list are added to the stop list in S90, and in S95', the value of L is decreased by one. Thus, the second time S40' is performed, the frequency of words having a length of seven or more (and not contained on the stop list) is determined.

The FIG. 3 method can be used on documents represented as coded ASCII data, or on undecoded bitmap images. If bitmap images are used, morphological image processing techniques can be used, for example, to compare word shapes in determining the frequency of occurrence of complex words.

Figure 4:
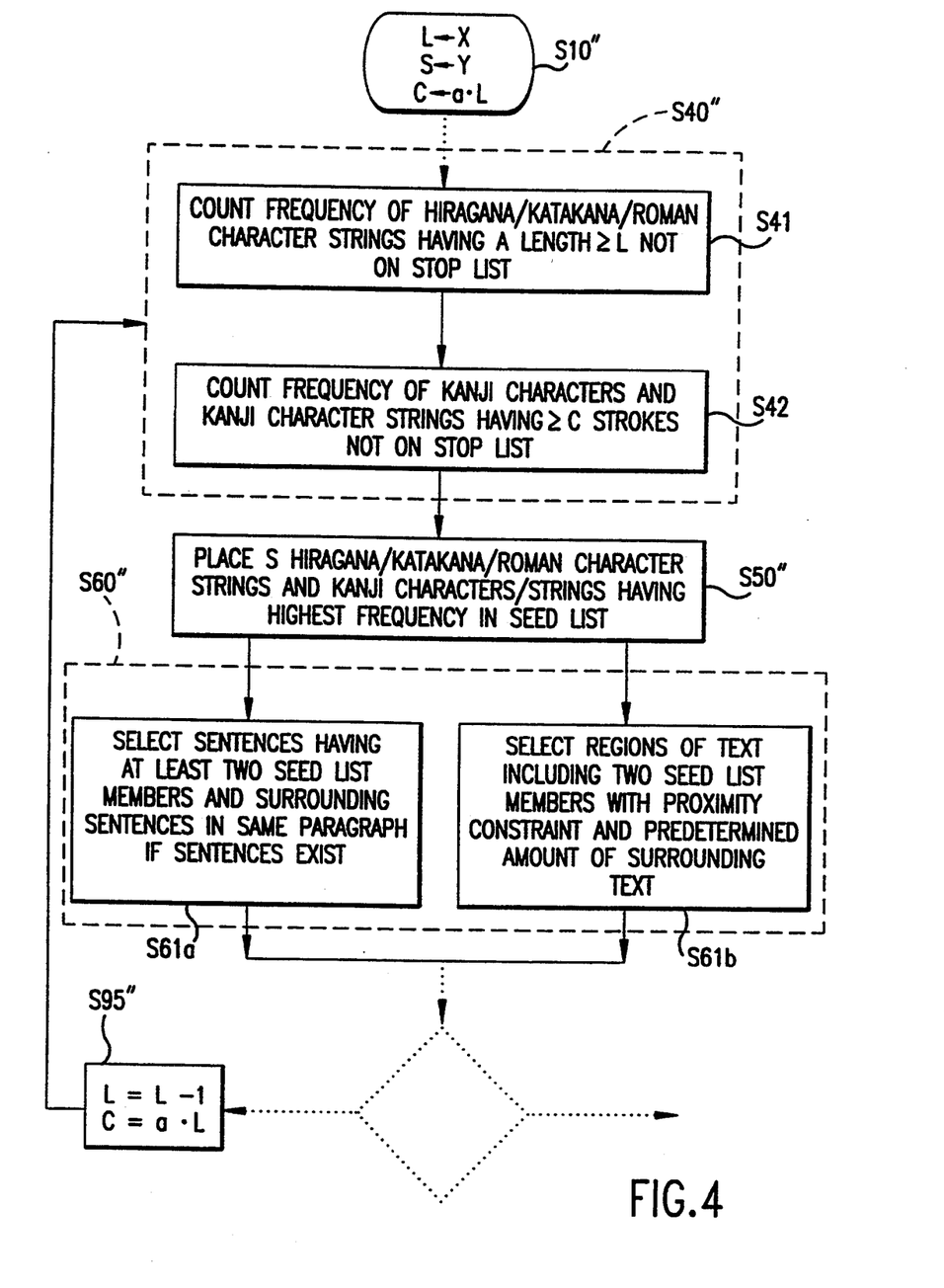
FIG. 4 is a partial flowchart of the FIG. 2 method adapted for Japanese language documents.

FIG. 4 illustrates the method of FIG. 2 adapted for use with Japanese language documents. Japanese differs from other languages in that it makes systematic use of four distinct writing systems: a roman alphabet, two syllabaries (hiragana and katakana) and Chinese (kanji) characters. Japanese is also written both horizontally and vertically, and there is usually no inter-word space.

Figure 7:
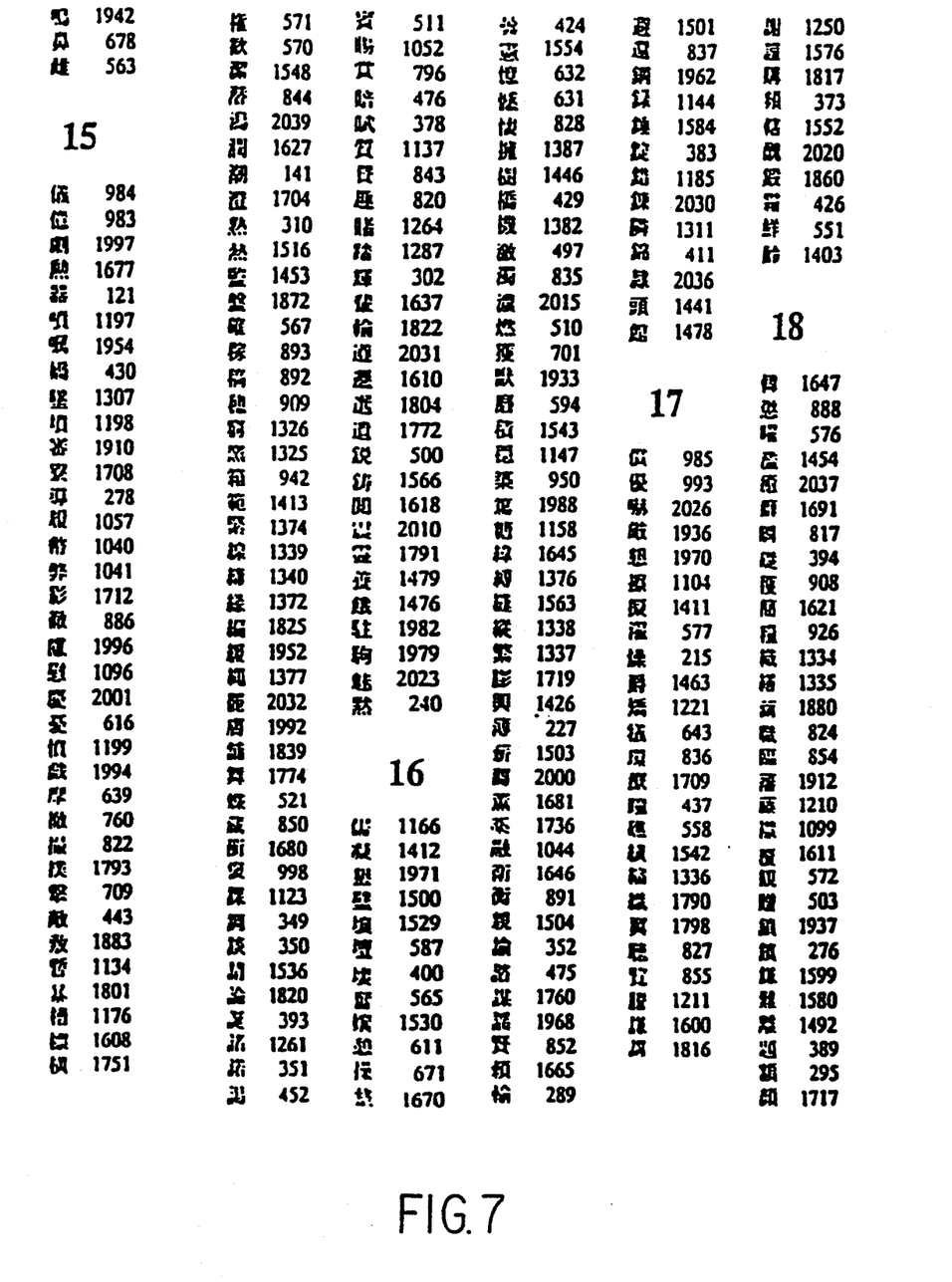
FIG. 7 is a list of kanji characters classified according to number of strokes.
Figure 8:
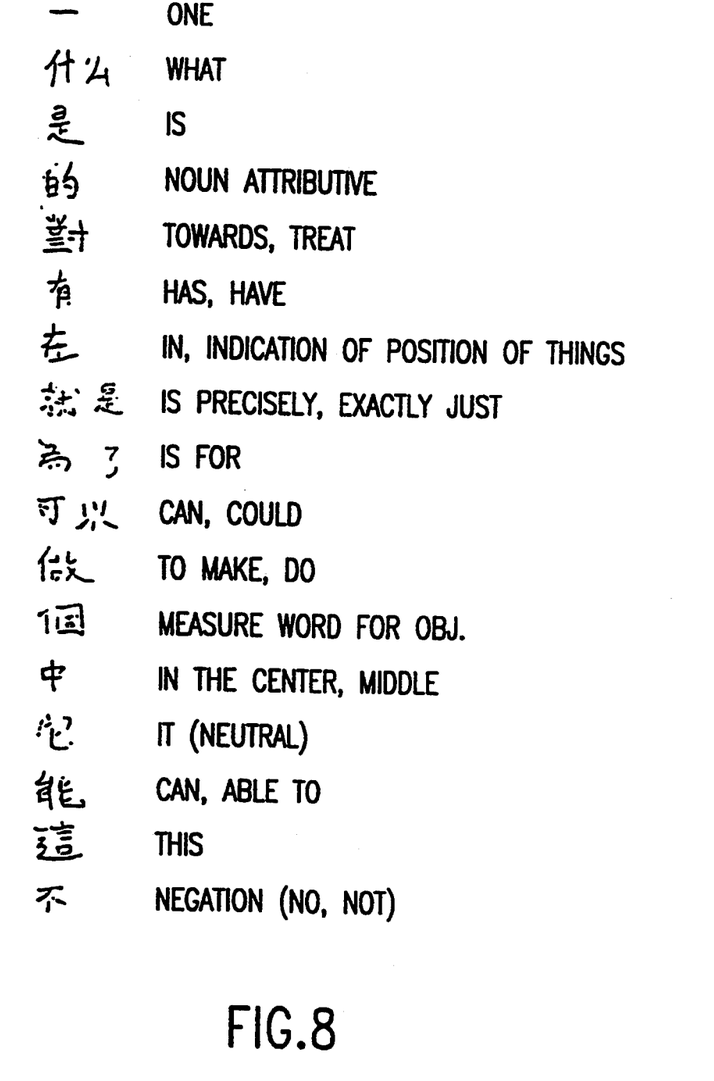
FIGS. 8–12 illustrate a stop list of commonly used kanji characters and character strings.
Figure 9:
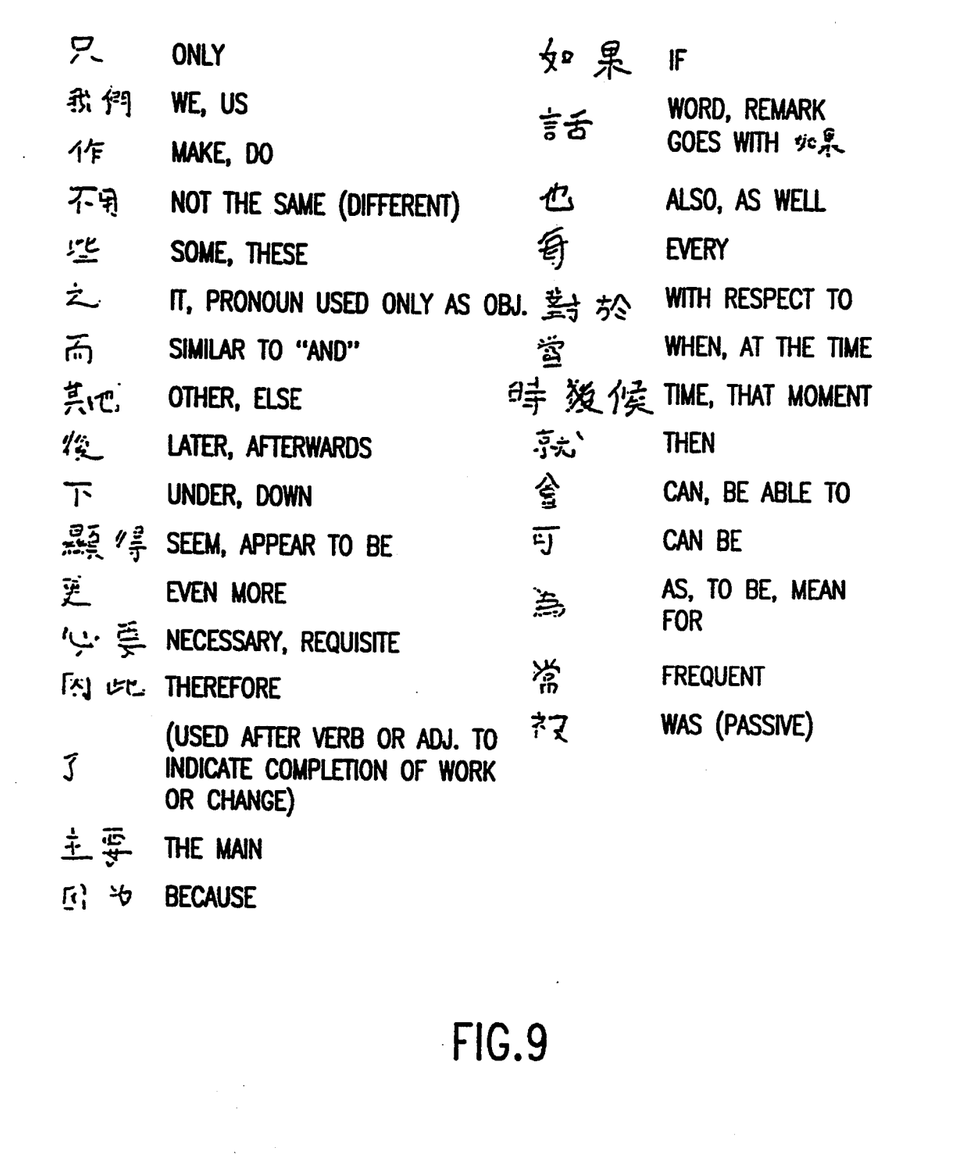
Figure 10:
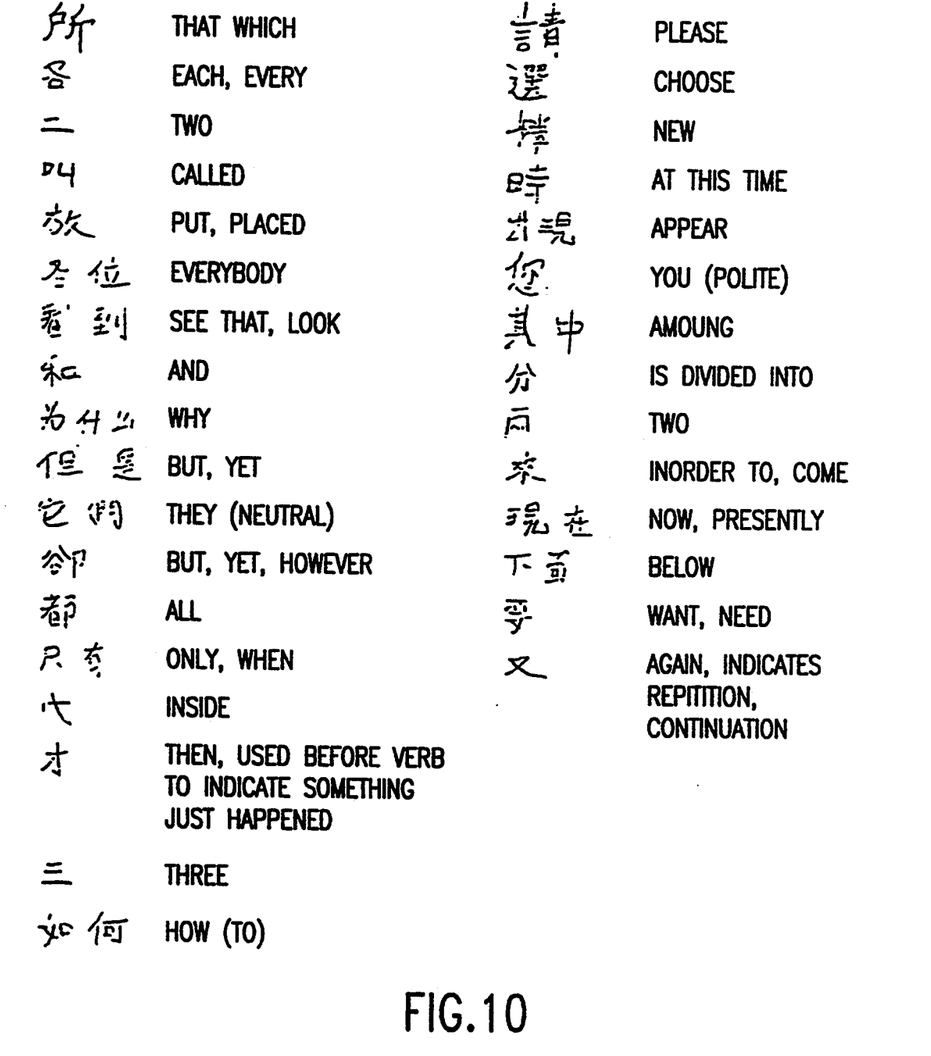
Figure 11:
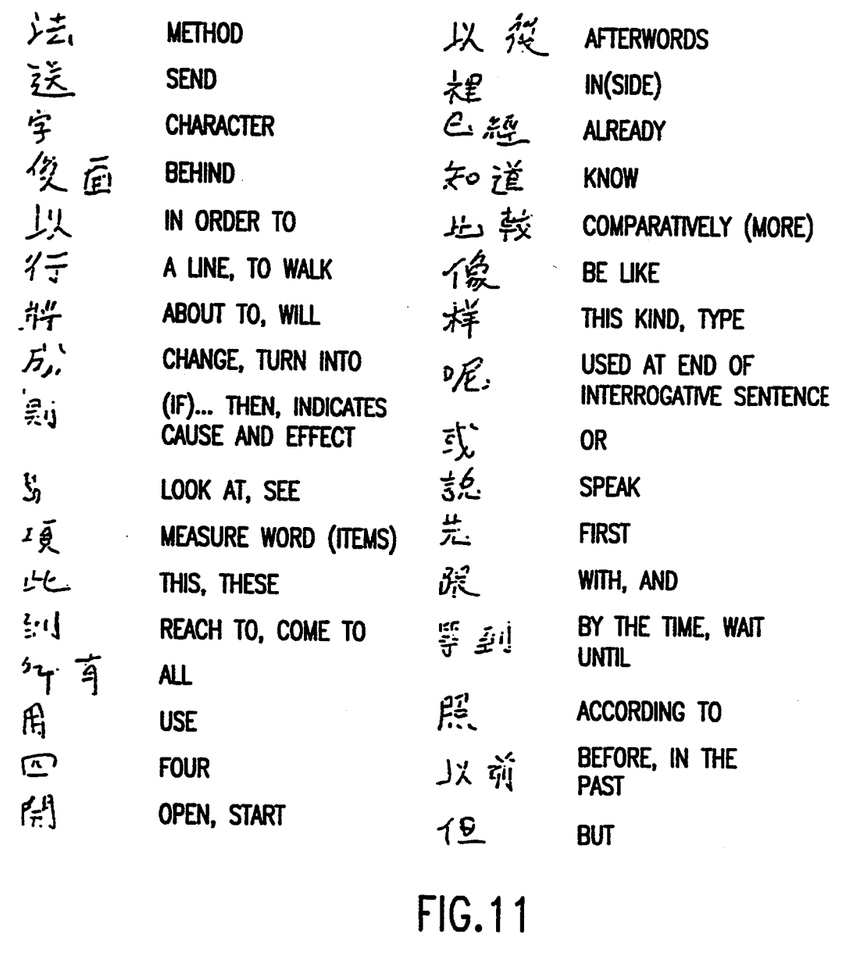
Figure 12:
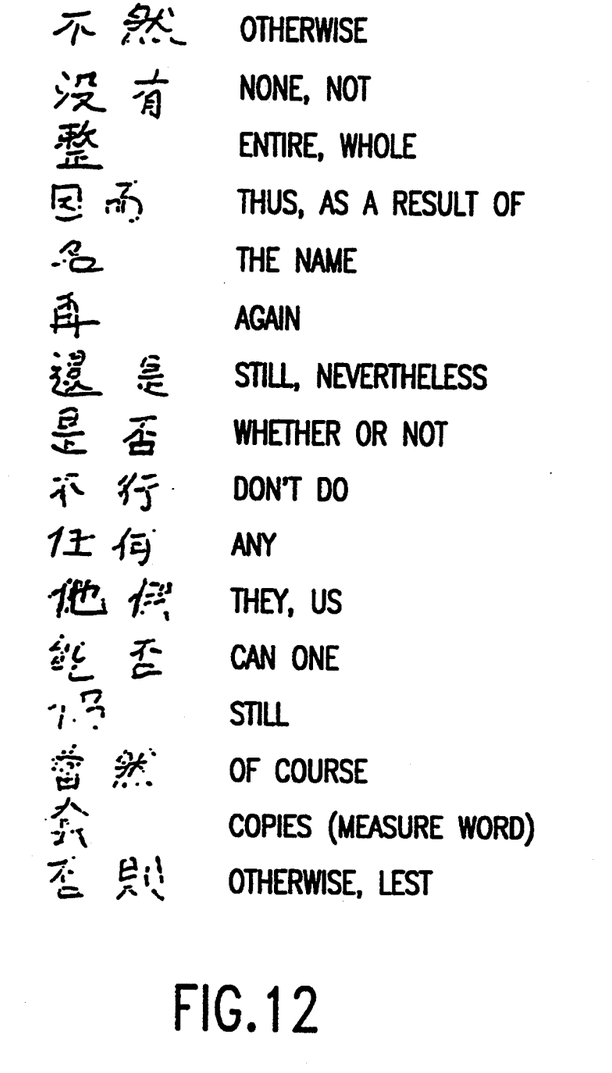

Initially, the reading order of the text (i.e., vertical verses horizontal) is determined. This information can be input to computer 100, or can be determined using known automatic processes. Machine readable text is usually in a canonical form. The general method disclosed in FIG. 2 is then adapted for use with Japanese by defining two types of complex expressions. A first type of expression is defined by character strings of hiragana, katakana or roman characters. The complexity of these character strings is determined based on their length, similar to the English-language embodiment described above. Kanji characters are treated differently. The complexity of kanji characters and frequently used kanji character strings is defined by the number of strokes in the kanji character or character string. FIG. 7 is a stroke table classifying kanji characters by stroke number (15, 16, 17, 18 etc.). Preferably, the Japanese language document is stored as character code so that the character type (i.e., hiragana, katakana, roman, kanji) is determined from the character code.

In the initialization step, S10", a value, X, is assigned to the character string length parameter, L. A value Y is assigned to the seed list length parameter, S. A stroke complexity parameter C must also be initialized. Preferably, the stroke complexity parameter C is normalized with respect to the length complexity parameter, L. Preferably, complex kanji characters or kanji character strings have a greater number of strokes than complex hiragana/katakana/roman character strings have characters. Accordingly, the stroke complexity parameter, C, is greater than the length complexity parameter, L. Thus, C is initialized to a value equal to L times a normalization variable, a, having a value greater than one. For example, a=2. Thus, in one preferred embodiment, initially, L=8 and C=16. The initial values of L, S, C, and a can be defined by a user or can be determined by default.

Referring to FIG. 2, in step S20, a Japanese language document is input. In preprocessing step S30, at least the tokenization step S32 is performed.

Figure 5:
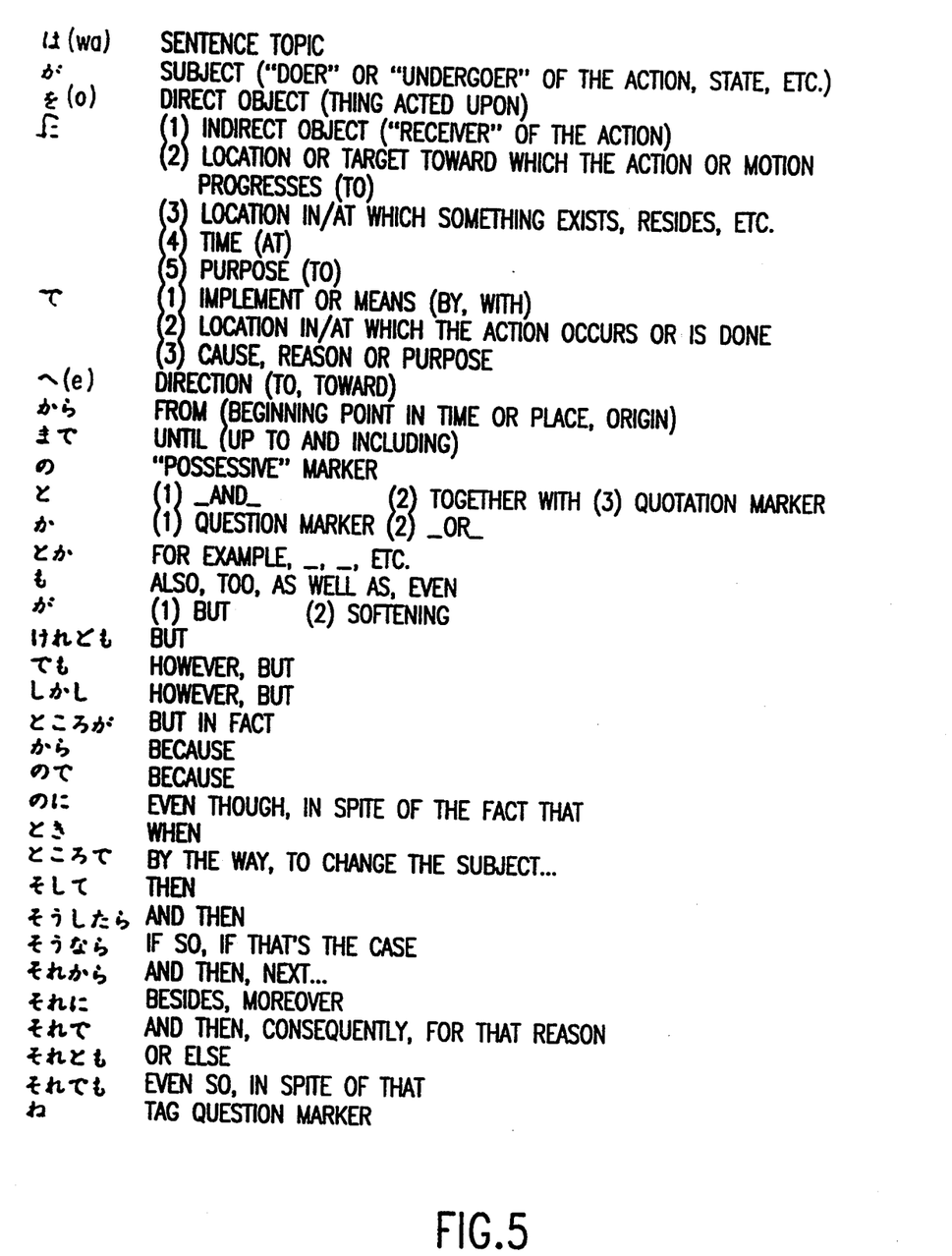
FIG. 5 is an illustrative Japanese language stop list.

In the tokenization step, character strings are identified as hiragana character strings, katakana character strings, roman character strings and kanji character strings. Preferably, in step S34, character strings contained on a stop list are removed. FIG. 5 is an illustrative stop list for a Japanese language document.

Next, referring to FIG. 4, in S40", the frequency of complex expressions are determined, wherein an expression corresponds to hiragana, katakana and roman character strings, and kanji characters and kanji character strings. First, in S41, the frequency of hiragana/-katakana/roman character strings having a length of at least L, and not included on the stop list is determined. Next, in S42, the frequency of kanji and kanji character strings having at least C strokes, and not included on the stop list, is determined. The seed list is formed in S50" by placing the S highest frequency hiragana/katakana/-roman character strings and kanji characters and character strings in the seed list.

Next, in S60", regions of the document relating to the document theme(s) are selected. If the Japanese language document contained sentences organized as paragraphs, as illustrated in S61a, regions are selected in a manner similar to that described above with respect to English-language documents. As an alternative, as illustrated in S61b, regions of text can be selected based upon the occurrence of at least two seed list members within a certain proximity of each other, along with a predetermined amount of surrounding text.

Next, flow proceeds to S70 in which the document summary is formed. The remaining steps are similar to those described above with respect to FIGS. 2 and 3, except that in S95", the value of L is decreased by one, and then the value of C is redetermined based upon the new value of L.

Figure 6:
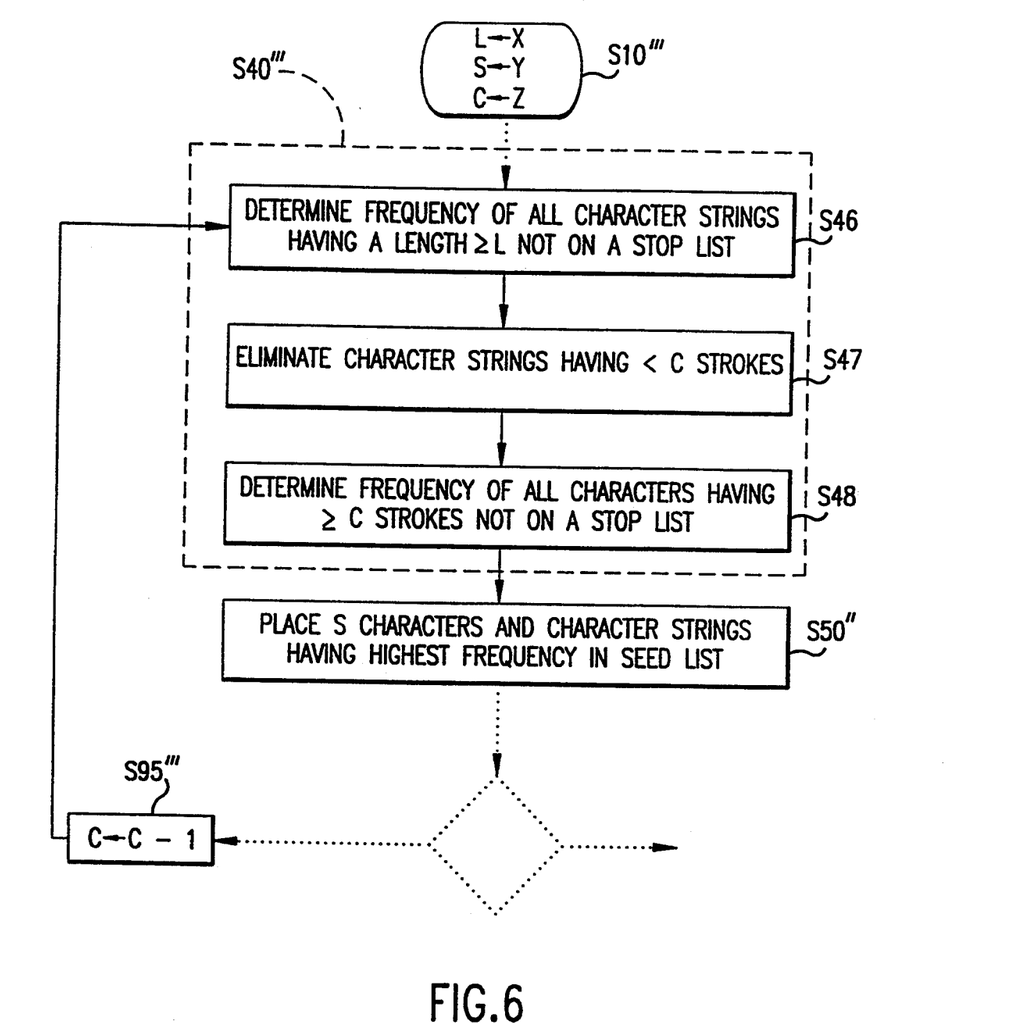
FIG. 6 is a partial flowchart of the FIG. 2 method adapted for Chinese-language documents.

Next, referring to FIG. 6, adaptation of the FIG. 2 method for use with documents written in a language that employs chinese characters will be described. The document is preferably produced as a file containing character codes. Alternatively, a scanned document should be recognized and converted into character codes prior to performing the invention. For languages employing chinese characters, complex expressions correspond to characters and character strings having a predetermined minimum number of strokes. As with the embodiments described above, useful expressions correspond to those which are the most frequently used in a document and which do not exist in a stop list of commonly used expressions. FIGS. 8–12 illustrate a stop list of commonly used expressions that can be used to initially remove expressions that do not contribute to producing a theme summary from a document having chinese characters. Additionally, because of a propensity for compounding, strings of chinese characters as well as individual characters should be considered as possible expressions. However, because there is no inter-word spacing with chinese characters, it can be difficult to determine when an expression represented by a plurality of characters begins and ends. The invention addresses these difficulties with relative ease because it relies upon the statistics of frequently occurring complex expressions.

In the initialization step, S10''', a value, X, is assigned to a character string length parameter, L. A value, Y, is assigned to the seed list parameter, S. A value, Z, is assigned to the complexity parameter, C. These values can be input by an operator or can be default values.

The complex expression frequency determination step, S40''', is as follows. In S46, the frequency of all character strings having a length of at least L and not contained on the stop list is determined. In theory, this could mean determining all possible sub-strings for the entire document because, typically, no inter-word spacing is included. In practice, however, this is facilitated by breaking the text according to punctuation and paragraph structure, and also at certain common characters representing morphemes that play a purely syntactic role. In S47, all character strings having less than C strokes are eliminated. In S48, the frequency of all characters having at least C strokes, and not included on the stop list, is determined. Thus, S40''' determines the frequency of all complex characters (having at least C strokes) and all complex character strings (having at least C strokes) not contained on the stop list.

In S50''', the S highest frequency complex characters and complex character strings are then placed in the seed list. The remaining steps are similar to those described above with respect to FIG. 2 except that in S95''', the value of C is decreased by one for each iteration of the procedure.

In a preferred embodiment, initially, S=6 and C=17.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An automated, computer implemented method of electronically processing a document stored in a memory of a computer, said document containing text represented by characters, said method comprising the steps of:
   a) using the computer, automatically determining a frequency of occurrence of expressions in the document not contained in a stop list and having at least a first predetermined level of complexity, said stop list stored in the memory of said computer;
   b) using the computer, automatically forming a seed list comprised of a second predetermined number of the most frequently occurring expressions determined in step (a), said seed list stored in said memory of said computer;
   c) using said computer, automatically forming a summary of the document comprised of regions in the document containing at least two members of said seed list, said summary stored in said memory of said computer; and
   d) using said computer, automatically repeating steps (a)-(c) on said summary until a length of said summary is no greater than a predetermined length, each time steps (a)-(c) are repeated, adding the members of said seed list to said stop list and reducing said first predetermined level of complexity.

2. The method of claim 1, wherein each expression is represented in the document as at least one character.

3. The method of claim 2, wherein at least some of said expressions are represented as character strings.

4. The method of claim 3, wherein the level of complexity of each character string is determined by said computer based on a length of said character string.

5. The method of claim 1, wherein the level of complexity of each expression is determined by said computer based on a length of said expression.

6. The method of claim 1, wherein the level of complexity of each expression is determined by said computer based on a number of strokes contained in said expression.

7. The method of claim 1, wherein each expression is a word, so that in step (a) said computer determines a frequency of occurrence of words in the document.

8. The method of claim 7, wherein the complexity of each word is determined by said computer based on a length of said word.

9. The method of claim 7, further comprising, using said computer, performing a word-stemming operation on words in said document prior to performing step (a).

10. The method of claim 1, wherein each of said regions comprises a portion of the document containing at least two of said members of said seed list.

11. The method of claim 10, wherein said portion is a sentence, so that each of said regions includes a sentence containing at least two of said members of said seed list.

12. The method of claim 1, wherein each of said regions comprises a sentence containing at least two of said members of said seed list and immediately preceding and following sentences located in a same paragraph as said sentence containing at least two of said members of said seed list.

13. The method of claim 1, further comprising including in a final summary of said document, any regions located in a first paragraph of said document, and contained in a summary of the document a first time step (c) is performed by said computer.

14. The method of claim 1, further comprising including in a final summary of said document, any regions located in a last paragraph of said document, and contained in a summary of the document a first time step (c) is performed by said computer.

15. The method of claim 1, further comprising including in a final summary of said document, any regions located in a first and a last paragraph of said document, and contained in a summary of the document a first time step (c) is performed by said computer.

16. The method of claim 1, wherein said stop list is empty before step (a) is performed a first time.

17. The method of claim 1, wherein said stop list includes a plurality of predefined stop expressions before step (a) is performed a first time.

18. The method of claim 17, wherein said predefined stop expressions include conjunctions, articles and modals.

19. The method of claim 1, wherein said summary is formed using said computer by extracting said regions from said document and constructing said summary from said extracted regions.

20. The method of claim 19, wherein said extracted regions are maintained in a same order in said summary as in the document.

21. The method of claim 1, wherein said second predetermined number is at least six.

22. The method of claim 1, wherein said predetermined length of said summary is no greater than one page.

23. The method of claim 1, further comprising using said computer, automatically outputting said summary when a length of said summary is no greater than said predetermined length.

24. The method of claim 23, wherein said summary is output on a display screen.

25. The method of claim 23, wherein said summary is output by a printer.

26. The method of claim 1, wherein said document includes roman characters, and step (a) comprises, using said computer, determining a frequency of occurrence of words defined by said roman characters in the document not contained in said stop list and having at least a predetermined number of said roman characters.

27. The method of claim 26, wherein said document is an English-language document.

28. The method of claim 1, wherein said document is a Japanese language document containing text represented by hiragana characters, katakana characters, roman characters, and kanji characters, and wherein step (a) includes:

using said computer, determining a frequency of occurrence of character strings in the document not contained in said stop list, containing at least one of said hiragana, katakana, and roman characters, and having at least a predetermined number of characters.

29. The method of claim 1, wherein said document is a Japanese language document containing text represented by hiragana characters, katakana characters, roman characters, and kanji characters, and wherein step (a) includes:

using said computer, determining a frequency of occurrence of kanji characters and repeated kanji character strings in the document not contained in said stop list, and containing at least a predetermined number of strokes.

30. The method of claim 1, wherein said document is a Chinese-language document containing text represented by chinese characters, and wherein:

step (a) includes using said computer, determining:
a frequency of occurrence of chinese characters in the document not contained in said stop list and having a predetermined number of strokes, and
a frequency of chinese character strings in the document not contained in said stop list, having at least a third predetermined number of chinese characters, and having said predetermined number of strokes; and step (b) includes forming said seed list from said second predetermined number of the most frequently occurring characters and character strings determined in step (a).

31. An automated, computer implemented method of electronically processing a document stored in a memory of a computer, said document containing words represented by roman characters, said method comprising the steps of:

a) using the computer, automatically determining a frequency of occurrence of words in the document having at least a first predetermined number of characters and not contained in a stop list that is stored in the memory of the computer;

b) using the computer, automatically forming a seed list comprised of a second predetermined number of the most frequently occurring words in the document having at least said first predetermined number of characters, said seed list stored in the memory of the computer;

c) using the computer, automatically forming a summary of the document comprised of regions in the document containing at least two words in said seed list, said summary stored in the memory of the computer; and d) using the computer, automatically repeating steps (a)-(c) on said summary until a length of said summary is no greater than a predetermined length, each time steps (a)-(c) are repeated, adding the words on said seed list to said stop list and reducing a value of said first predetermined number.

32. The method of claim 31, wherein said document is an English-language document.

33. The method of claim 31, further comprising using said computer, performing a word-stemming operation on words in said document prior to performing step (a).

34. The method of claim 31, wherein said regions include at least a sentence containing said at least two words in said seed list.

35. The method of claim 31, wherein each of said regions comprises a sentence containing said at least two words in said seed list and immediately preceding and following sentences located in a same paragraph as said sentence containing said at least two words in said seed list.

36. The method of claim 31, further comprising including in a final summary of said document, any regions located in a first paragraph of said document, and contained in a summary of the document a first time step (c) is performed by the computer.

37. The method of claim 31, further comprising including in a final summary of said document, any regions located in a last paragraph of said document, and contained in a summary of the document a first time step (c) is performed by the computer.

38. The method of claim 31, wherein said stop list is empty before step (a) is performed a first time.

39. The method of claim 31, wherein said stop list includes a plurality of predefined stop words before step (a) is performed a first time.

40. The method of claim 31, further comprising using said computer, automatically outputting said summary when a length of said summary is no greater than said predetermined length.

41. An automated, computer implemented method of electronically processing a Japanese language document stored in a memory of a computer, said document containing text represented by hiragana characters, katakana characters, roman characters, and kanji characters, said method comprising the steps of:

a) using the computer, automatically determining a frequency of occurrence of character strings in the document not contained in a stop list, containing at least one of said hiragana, katakana, and roman characters, and having at least a first predetermined number of characters, said stop list stored in the memory of the computer;

b) using the computer, automatically determining a frequency of occurrence of kanji characters and repeated kanji character strings in the document not contained in said stop list, and containing at least a second predetermined number of strokes;

c) using the computer, automatically forming a seed list stored in the memory of the computer, said seed list comprised of a third predetermined number of the most frequently occurring:
character strings in the document having at least said first predetermined number of characters, and
kanji characters and repeated kanji character strings in the document having at least said second predetermined number of strokes;

d) using the computer, automatically forming a summary of the document comprised of all sentences in the document containing at least two members of said seed list and surrounding sentences, said summary stored in the memory of the computer; and e) using the computer, automatically repeating steps (a)-(d) on said summary until a length of said summary is no greater than a predetermined length, each time steps (a)-(d) are repeated, adding the members on said seed list to said stop list and reducing values of said first and second predetermined numbers.

42. An automated, computer implemented method of electronically processing a Chinese-Language document stored in a memory of a computer, said document containing text represented by Chinese characters, said method comprising the steps of:
a) using the computer, automatically determining a frequency of occurrence of character strings in the document not contained in a stop list, having at least a first predetermined number of characters, and containing at least a second predetermined number of strokes, said stop list stored in the memory of the computer;
b) using the computer, automatically determining a frequency of occurrence of characters in the document not contained in said stop list and containing at least said second predetermined number of strokes;
c) using the computer, automatically forming a seed list comprised of a third predetermined number of the most frequently occurring characters and character strings determined in steps (a) and (b), said seed list stored in the memory of the computer;
d) using the computer, automatically forming a summary of the document comprised of all sentences in the document containing at least two members of said seed list and surrounding sentences, said summary stored in the memory of the computer; and
e) using the computer, automatically repeating steps (a)-(d) on said summary until a length of said summary is not greater than a predetermined length, each time steps (a)-(d) are repeated, adding the members on said seed list to said stop list and reducing values of said first and second predetermined numbers.

43. A computer apparatus for automatically processing a document containing text represented by characters, comprising:
input means for automatically inputting a document into a memory of the computer apparatus to produce document data;
a processor coupled to said memory and including:
frequency determining means, receiving said document data from said memory, for automatically determining a frequency of occurrence of expressions in the document not contained in a stop list and having at least a first predetermined level of complexity, said frequency determining means outputting expression frequency data, said stop list stored in said memory;
seed list defining means, receiving said expression frequency data from said frequency determining means, for automatically defining a seed list comprised of a second predetermined number of the most frequently occurring expressions in the document, said seed list stored in said memory;
identifying means for automatically identifying portions of the document data containing at least two members of said seed list;
summarizing means for automatically forming a summary by combining said portions identified by said identifying means, said summary stored in said memory;
length determining means for automatically determining whether a length of said summary is not greater than a predetermined length; and
control means for automatically outputting said summary as a document summary when said length determining means determines said summary to be not greater than said predetermined length, otherwise automatically inputting said summary as a document to said input means, adding members of said seed list to said stop list, and reducing said first predetermined level of complexity so that said document data is iteratively processed until a document summary is produced having a length not greater than said predetermined length.

44. The apparatus of claim 43, wherein said input means produces said document data as decoded text data.

45. The apparatus of claim 43, wherein said expressions are represented in the document as at least one character, and said frequency determining means automatically determines whether said expressions have said first predetermined level of complexity by determining a number of strokes in said expressions.

46. The apparatus of claim 43, wherein said expressions are represented in the document as character strings, and said frequency determining means automatically determines whether said expressions have said first predetermined level of complexity by determining a number of characters in said expressions.

47. The apparatus of claim 43, wherein said expressions are represented in the document as character strings, and said frequency determining means automatically determines whether said expressions have said first predetermined level of complexity by determining a number of strokes in said expressions.

48. The apparatus of claim 43, wherein said expressions are represented in the document as words, and said frequency determining means automatically determines whether said expressions have said first predetermined level of complexity by determining a length of said words.

49. The apparatus of claim 48, wherein said frequency determining means automatically determines the length of said words by determining a number of characters in said words.

50. The apparatus of claim 43, wherein said identifying means automatically identifies sentences containing at least two of said members of said seed list.

51. The apparatus of claim 50, wherein each of said portions includes a sentence containing at least two of said members of said seed list and immediately preceding and following sentences located in a same paragraph as said sentence containing at least two of said members of said seed list.

52. The apparatus of claim 43, wherein said processor further includes means for automatically predefining members of said stop list before a document is input to said input means.

53. The apparatus of claim 43, wherein said summarizing means forms said summary by extracting said portions from said document and constructing said summary from said extracted portions while maintaining said extracted portions in a same order in said summary as in the document.

54. The apparatus of claim 43, further comprising a display screen for displaying said output document summary.

55. The apparatus of claim 43, further comprising a printer for printing said output document summary.

* * * * *